Dec. 6, 1949   W. L. MAXSON   2,490,076
ELECTRIC OVEN

Filed Sept. 18, 1945   2 Sheets-Sheet 1

INVENTOR
WILLIAM L. MAXSON
BY
Moses, Nolte, Crews & Berry
ATTORNEYS

Dec. 6, 1949 W. L. MAXSON 2,490,076
ELECTRIC OVEN
Filed Sept. 18, 1945 2 Sheets-Sheet 2

INVENTOR
WILLIAM L. MAXSON
BY
Moses, Nolte, Crews + Berry
ATTORNEYS

Patented Dec. 6, 1949

2,490,076

UNITED STATES PATENT OFFICE 2,490,076

ELECTRIC OVEN

William L. Maxson, West Orange, N. J., assignor, by mesne assignments, to Foremost Dairies, Inc., a corporation of New York Application September 18, 1945, Serial No. 616,980

9 Claims. (Cl. 219—35)

This invention relates to electric ovens.

The present application is a continuation in part of my copending, now abandoned, application Serial No. 573,823, filed January 22, 1945.

The electric oven of the present invention in its preferred form of embodiment is adapted to receive and contain a plurality of shallow frozen food containers or plates in vertically spaced relation, one above the other, so that when heated air is circulated throughout the oven, the air will pass over both the top and bottom sides of each food container. The oven is substantially air tight and the air therein is forcibly circulated by an electric fan mounted on the rear wall of the oven. A U-shaped baffle extending from top to bottom is disposed in the oven for causing the air which is withdrawn through an opening in the rear of the baffle, and from the space where the food containers are supported, to be circulated around the sides of the oven, where heat is taken from electric heating elements mounted on the side walls of the oven, and delivered again to the front of the baffle. Brackets are provided on the baffle for supporting the thin, flat food containers horizontally, one above another, for impartial parallel exposure to the air stream.

By virtue of the vegetables on the food container being subjected to hot, forcibly circulated air to effect the thawing and the cooking action upon the same, there is tendency for vegetables or like foods to be dried. In order to prevent this drying and to permit more heat to be used, if desired, baffles of metal or other suitable material are fitted into the oven in such position as to cover a portion of each plate and particularly that portion thereof which contains the vegetables. The structure for accomplishing this result is part of the subject matter of this application.

Accordingly, it is an object of the present invention to provide in an oven of this type, baffle means adapted to serve as a cover for the vegetable or other desired portions of the food container to prevent drying out.

It is another object of the invention to provide an oven with a cover means of this type, the oven being so constructed that the cover can be supported within the oven independently of the food container itself and in such a manner that it covers the vegetable or other desired portion of the food container, but leaves the remaining portion of the meal, such as the meat portion thereof directly exposed to the heating air.

It is still another object of the invention to provide a cover or baffle means for the food container which is not only supported in the oven independently of the food container but may be removed therefrom so that it can be cleaned and scoured.

According to the invention a baffle plate is provided for each of the food containers within the oven. The food containers are supported on brackets on a U-shaped member extending vertically in the oven. Above each bracket and on the U-shaped member is another bracket having a surface on which the baffle plate can be slid into position over the vegetable portions of the food container. This sliding surface serves to support the baffle plate independently of the container, but so that the bottom face of the baffle plate lies adjacent to the rim of the food container. Finger elements serve to removably hold the baffle plate on the supporting surface. The baffle plate may be left in position in the oven while the food container is withdrawn therefrom or in cases where the baffle plate is not to be used it can be removed from the oven. When the baffle plate is in position over the food container the heated air upon being circulated through the oven will thus be prevented from coming in contact in great quantity with the vegetable portions in the food container. On the other hand, the meat portions on the food container are left fully exposed and in direct heating contact with the circulated heating air.

For other objects and for a better understanding of the invention, reference may be had to the following detailed description taken in connection with the accompanying drawing, in which Fig. 1 is a fragmentary top plan view of the oven with portions cut away and shown in section;

Figure 1:
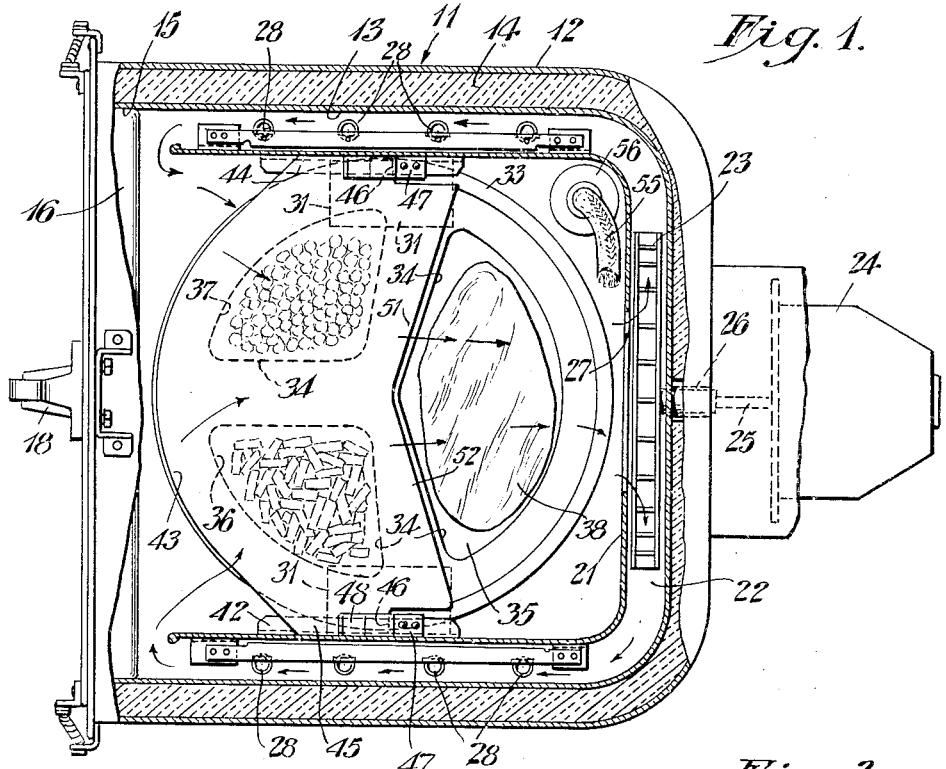
Figures 2, 3:
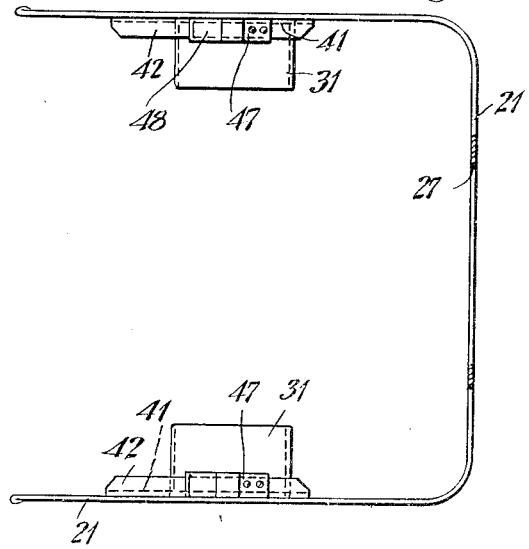
Fig. 2 is a plan view of the baffle plate.
Fig. 3 is a detailed view in section of the main baffle within the oven and of the means thereon for supporting the food container and the baffle plate.

Referring now to the figures, there is shown an oven casing 11, including an outer plate 12, an inner lining 13 and insulating material 14 disposed therebetween. The front portion of the oven casing 11, has an opening 15, in which is disposed an oven door or a closure 16. This door 16, is hinged at 17, to the bottom of the casing 11 and when in the closed position is releasably retained by a latch 18 cooperating with a locking shoulder 19 affixed to the casing 11.

Within the casing 11 and extending from the bottom thereof to the top is a U-shaped baffle plate 21. This baffle plate 21 is disposed so as to be spaced from the sides and rear walls of the casing and so that its open side faces the oven opening 15 at the front of the lining 13. In a passageway 22 formed between the baffle and the casing 12, air is circulated by a fan 23 driven by a motor 24 carried on the rear wall of the casing. The motor 24 is located externally of the casing and is connected with the fan 23 by a shaft extending in an opening 26 in the casing. This fan 23 receives air from within the baffle by way of an opening 27 in the rear of the baffle and forces the same radially outwardly into the passageway 22. As the air is passed through the passageway 22 it is heated by heating elements 28 mounted on the outside surfaces of the baffle. The baffle 21 may be removably secured in place within the oven and withdrawn therefrom when it is desired to replace the heating elements 28.

This main baffle 21 has shelving projections or brackets 31 extending inwardly from its sides thereof, on which the food containers 32 are rested as they are disposed in the oven. The baffle 21 and these projections 31 constitute means for supporting the food containers. There is one projection at each side and a plurality of them, one above the other, to respectively support the several containers 32 placed in the oven. The food containers 32 may be of metal or of paper formation and include a rim portion 33 and radially disposed partitions 34 forming a plate of the blue plate type. Between the partitions 34 there are provided separate recesses 35, 36 and 37. The recess 35 contains a meat portion 38, while the smaller recesses 36 and 37 contain vegetable portions, such as fried potatoes and peas.

In preparing the food container, the meat and vegetables are first separately precooked for a predetermined period of time that is so calculated, that when all three are simultaneously subjected to the final heating and cooking step, all foods will arrive simultaneously at the finally cooked stage. After the pre-cooking operation the meat and vegetables or other foods are disposed on the container in blue plate fashion and covered with a paper or other cover. The container, foods and cover are then subjected to a quick-freezing operation and stored in a refrigerator until they are ready to be used.

At the time that they are to be inserted in the oven, the temporary cover is removed from the container and the container is rested on the projections 31 in the oven with the meat portion disposed to the rear.

Immediately above the projections 31 are baffle supporting shelves 41 having horizontally extending surfaces 42. A baffle plate 43 has bottom bearing surfaces 44 and 45 which are slid over the surfaces 42 of the baffle plate supporting bracket 41 to locate the baffle plate above the vegetables. The plate 43 will slide rearwardly until edges 46 of the bearing surfaces abut the base of a retaining finger 47. The finger 47 has a spring finger projection 48 adapted to engage the top surface of the baffle plate to hold the plate against the surfaces 42 of the bracket 41. The baffle plate 43 has inwardly extending projections 51 and 52 adapted to cover the slightly angled partitions 34 extending between the meat and vegetable portions.

Figure 4:
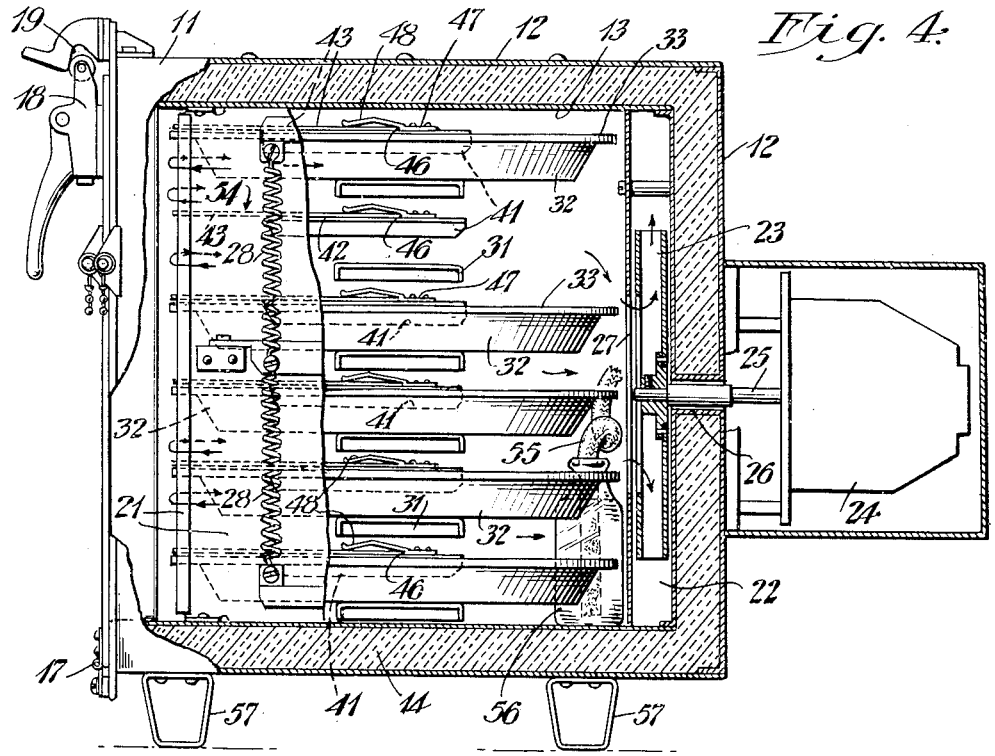
Fig. 4 is a fragmentary elevational view with parts broken away and partly in section.

The plate 43 when in place in the oven serves to cover the vegetables. The spacing between the container brackets and the baffle plate surface 42 is such that there will be little spacing between the baffle plate and the flange 33 of the container. The baffle 43 is thus carried by the main baffle 21 and independent of the container 32. The container 32 can be removed without the baffle being removed as illustrated at 54, Fig. 4, or at times when it is desired that the meat be made less well done, the baffle plate 43 can be removed from the oven and the vegetables left exposed to the heating air.

However, with the baffle plate 43 in position the air current which passes over the container 32 is diverted from coming into direct contact with the vegetable or other selected portion of the container covered by the baffle plate. The vegetables are thus isolated from the moving heating air by the baffle and by relatively still heating air which will be found beneath the baffle.

In order to maintain a high degree of humidity within the oven and prevent the food from drying out altogether, there may be provided a humidifying wick 55 leading from a bottle 56 containing water. The casing 11 may be supported on a table or shelf by supporting legs 57.

It should now be apparent that there has been provided baffle plate means adapted to be located in an oven over the vegetable portions of the food container and supported on the main baffle 21 and independently of the food container.

I have described what I believe to be the best embodiments of my invention. I do not wish, however, to be confined to the embodiments shown, but what I desire to cover by Letters Patent is set forth in the appended claims.

I claim:

1. In an oven, a casing defining the walls of the oven, means for circulating hot air in the oven, said casing having an opening through which food may be passed to the interior thereof, closure means for the opening, means adapted to support in a predetermined position in the oven a shallow container having a selection of foods thereon so that heating air may be circulated over the top and bottom of the container, a baffle supported a short distance above the container support and extending over a substantial portion of the container area while leaving another substantial portion of such area uncovered to divert the circulating air from food in the first mentioned portion of said area to delay the cooking thereof, and means separate from the container for retaining the baffle in place thereover.

2. An oven as defined in claim 1 in which the supporting means for the container includes a vertically-extending part and said retaining means for the baffle is mounted on the vertically-extending part of the container-supporting means.

3. In an oven, a box-like structure defining the walls of the oven, means for circulating hot air in the oven, said structure having an opening through which food may be passed to the interior thereof, closure means for the opening, means adapted to support in a predetermined container location a shallow container adapted to have a selection of foods thereon so that heating air may be circulated over the top and bottom thereof, supporting means for the container, a separable baffle adapted to be fitted over a portion only of the container area to divert the heating air from at least one of the foods in order to delay its cooking time, and means independent of the container for releasably supporting the baffle and retaining the baffle in place over the food container.

4. An oven as defined in claim 3 in which said releasable retaining means includes supporting surface means over which said baffle may be slid into place over the container, and resilient finger means for releasably forcing the baffle against the supporting surface.

5. In an oven, a casing having an opening through which food containers may be passed to the interior thereof, closure means for the opening, means for circulating heated air within said casing, a baffle in the casing extending from the bottom to the top thereof and in spaced relation thereto so as to cause the circulating air to travel horizontally through and alongside of a food heating chamber partially bounded by the baffle, means on the baffle adapted to support in a predetermined location shallow food containers in parallel relation for impartial exposure to the air stream so that the air stream may pass over the tops and bottoms of the containers, additional baffles for the individual containers, each adapted to cover a part but not all of the associated container to divert air from food contained in the covered areas and to delay the cooking time of such covered food, and means provided on the first baffle independently of the containers for retaining the additional baffles in place over the containers.

6. An oven as defined in claim 5 in which the baffle retaining means includes in each instance a supporting surface on which the additional baffle may be rested and a resilient finger for forcing the additional baffle against the supporting surface.

7. In an oven, in combination, a housing, means for circulating a hot air current through the housing, means for supporting in substantially predetermined horizontal positions compartmentized, shallow dishes or trays in the air current, shields supported short distances above the respective dish supports, and of less areas than the available dish areas so that they may be used to cover substantial, predetermined portions of the available dish areas while leaving other substantial, predetermined portions of the dish areas clear, and supports for the shields independent of the dishes which the shields are designed to cover in part.

8. In an electric oven, a substantially airtight box-like structure defining the walls of the oven and having an opening through which food is passed to the interior thereof, closure means for the opening operable to an open position thereby permitting the oven to be supplied with food elements to be heated, a baffle of U-shape or channel form having open side and ends, said baffle plate connected to the interior of the box-like structure to extend vertically therein and so that its open side faces the oven opening and its ends are enclosed by the top and bottom walls of the structure, said baffle plate otherwise being spaced from the structure side and rear walls to provide a path for circulating air, an electric motor mounted on the rear wall of the structure and having a shaft extending through the wall and into the interior of the structure, a centrifugal fan on the shaft end and in rear of the baffle, said baffle having an opening concentric with the motor shaft by which air is extracted from within the baffle for recirculation radially of the fan, the air then passing about the sides of the baffle, through the open side thereof and into the food space within the baffle and in a direction over the food elements parallel to the top and bottom surfaces thereof, and electric heating elements mounted on the side walls of the structure and in position to be traversed by the circulating air.

9. In an oven, in combination, a substantially airtight casing, a baffle, U-shaped in horizontal cross-section, cooperative with the casing to define a recirculatory airflow path, which path includes a food heating chamber within the baffle through which air is caused to travel substantially horizontally, the casing having an opening at the front for the admission and removal of food, a closure for said opening, said baffle having an open side disposed toward said opening in the casing, and having a passage in the side opposite the one at which it is open to permit the circulation of air through the heating chamber in a substantially horizontal direction and alongside the heating chamber, a source of heat in said path, and a blower mounted on the rear wall of the casing and disposed behind the rear wall of the baffle for recirculating the air through said path, said baffle including upon its side walls means for supporting thin, flat food containers horizontally, one above another, for impartial parallel exposure to the air stream.

WILLIAM L. MAXSON.

REFERENCES CITED

The following references are of record in the file of this patent:

UNITED STATES PATENTS

| Number | Name | Date |
| --- | --- | --- |
| 655,462 | Smith | Aug. 7, 1900 |
| 867,086 | Sullivan | Sept. 24, 1907 |
| 968,165 | Kellogg | Aug. 23, 1910 |
| 1,003,428 | Brust | Sept. 19, 1911 |
| 1,218,341 | Truitt | Mar. 6, 1917 |
| 1,893,694 | Bohnker | Jan. 10, 1933 |
| 2,257,159 | Crites | Sept. 30, 1941 |
| 2,412,103 | Spooner | Dec. 3, 1946 |

FOREIGN PATENTS

| Number | Country | Date |
| --- | --- | --- |
| 332,874 | Great Britain | July 31, 1930 |